United States Patent
Iwasaki et al.

(10) Patent No.: US 9,595,285 B2
(45) Date of Patent: Mar. 14, 2017

(54) MAGNETIC RECORDING MEDIUM AND MAGNETIC RECORDING AND REPRODUCING APPARATUS

(71) Applicant: Kabushiki Kaisha Toshiba, Minato-ku (JP)

(72) Inventors: Takeshi Iwasaki, Inagi (JP); Akira Fujimoto, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 240 days.

(21) Appl. No.: 14/513,461

(22) Filed: Oct. 14, 2014

(65) Prior Publication Data

US 2016/0035382 A1 Feb. 4, 2016

(30) Foreign Application Priority Data

Jul. 30, 2014 (JP) .................. 2014-155116

(51) Int. Cl.
*G11B 5/66* (2006.01)
*G11B 5/73* (2006.01)

(52) U.S. Cl.
CPC ............ *G11B 5/7325* (2013.01); *G11B 5/732* (2013.01)

(58) Field of Classification Search
CPC ........ G11B 5/732; G11B 5/7325; G11B 5/738
USPC .............................. 428/831, 831.2
See application file for complete search history.

(56) References Cited

U.S. PATENT DOCUMENTS

| 8,492,010 | B2 | 7/2013 | Hellwig et al. | |
| 9,214,177 | B2 * | 12/2015 | Iwasaki | G11B 5/66 |
| 2003/0170500 | A1 | 9/2003 | Shimizu et al. | |
| 2007/0072012 | A1 | 3/2007 | Nakamura et al. | |
| 2013/0250453 | A1 | 9/2013 | Iwasaki | |

FOREIGN PATENT DOCUMENTS

| JP | 2003-123245 | 4/2003 |
| JP | 2013-125554 | 6/2013 |
| JP | 2015-111482 A | 6/2015 |

OTHER PUBLICATIONS

English Machine Translation of JP 2013-125554, Sakawaki, Jun. 24, 2013.*
U.S. Appl. No. 14/193,497, filed Feb. 28, 2014, Takeshi Iwasaki.

* cited by examiner

*Primary Examiner* — Holly Rickman
(74) *Attorney, Agent, or Firm* — Oblon, McClelland, Maier & Neustadt, L.L.P.

(57) ABSTRACT

According to one embodiment, a magnetic recording medium includes an orientation control layer formed on a non-magnetic substrate, the orientation control layer made of a Ni alloy or Ag alloy having fcc structure, a non-magnetic seed layer made of Ag, Ge, and a metal X selected from the group consisting of Al, Mg, Au, and Ti, a non-magnetic intermediate layer made of Ru or Ru alloy, and a magnetic recording layer. The orientation control layer is in contact with the non-magnetic seed layer.

12 Claims, 4 Drawing Sheets

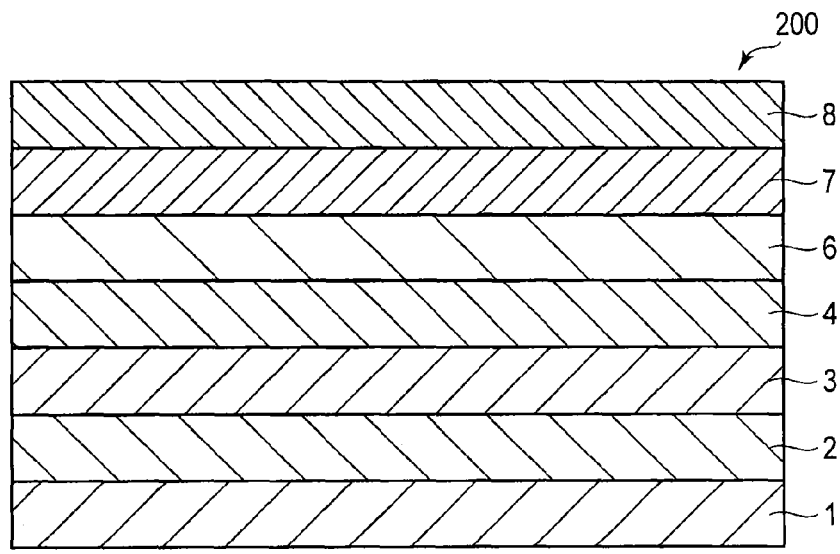
F I G. 3
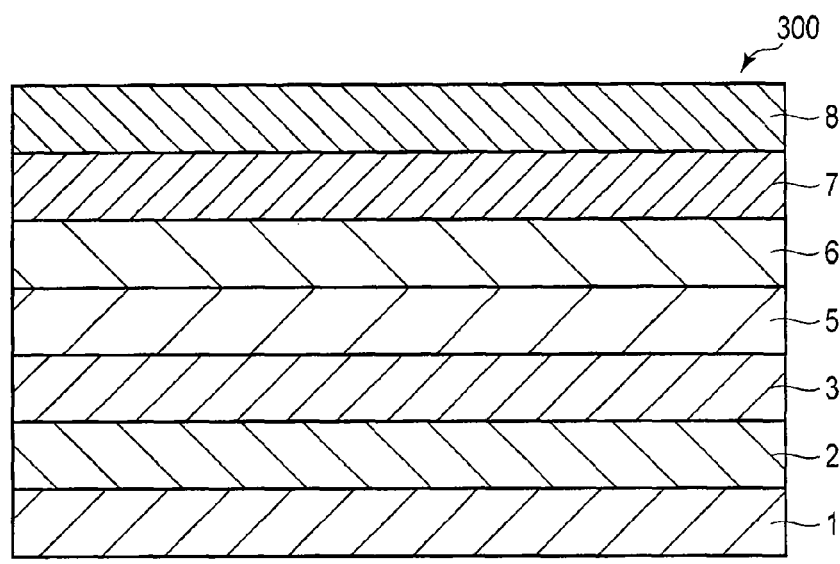
F I G. 4

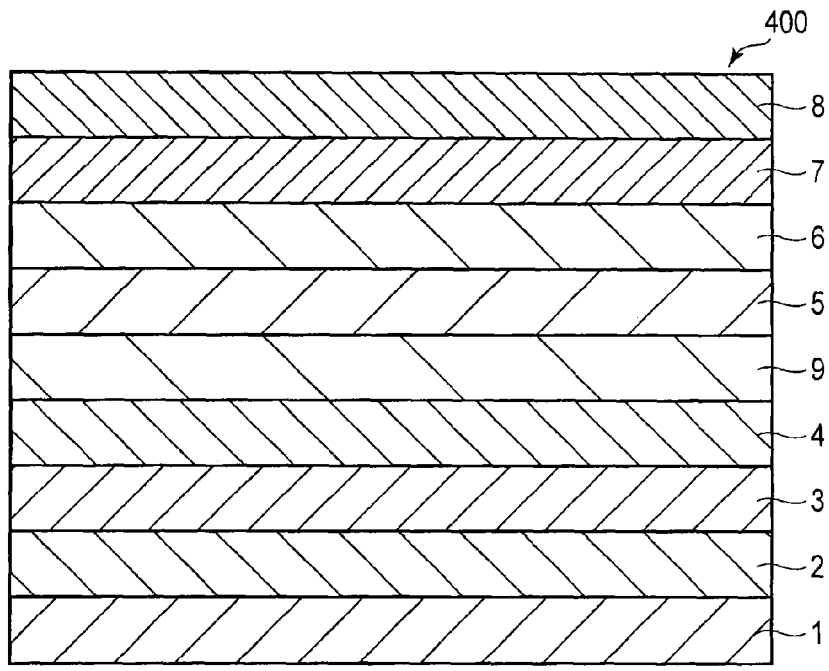
F I G. 5
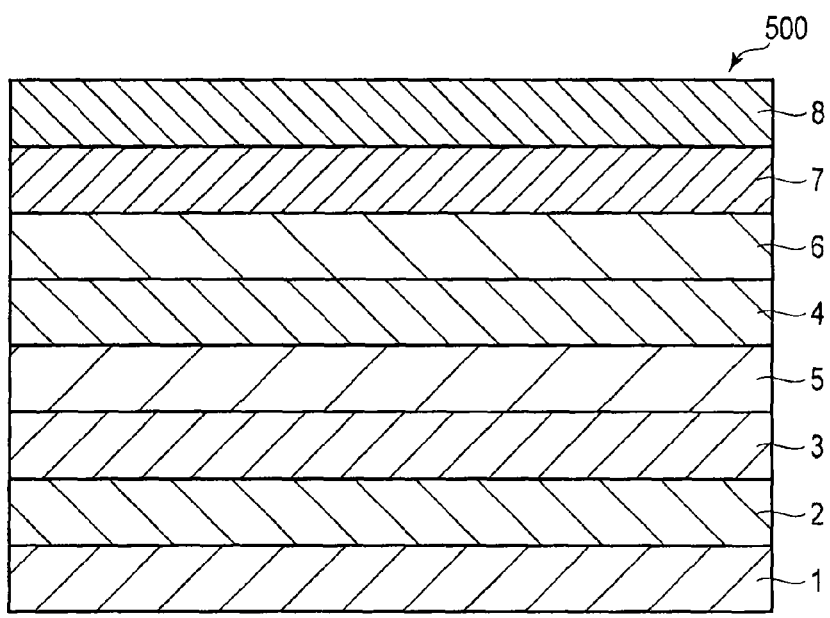
F I G. 6

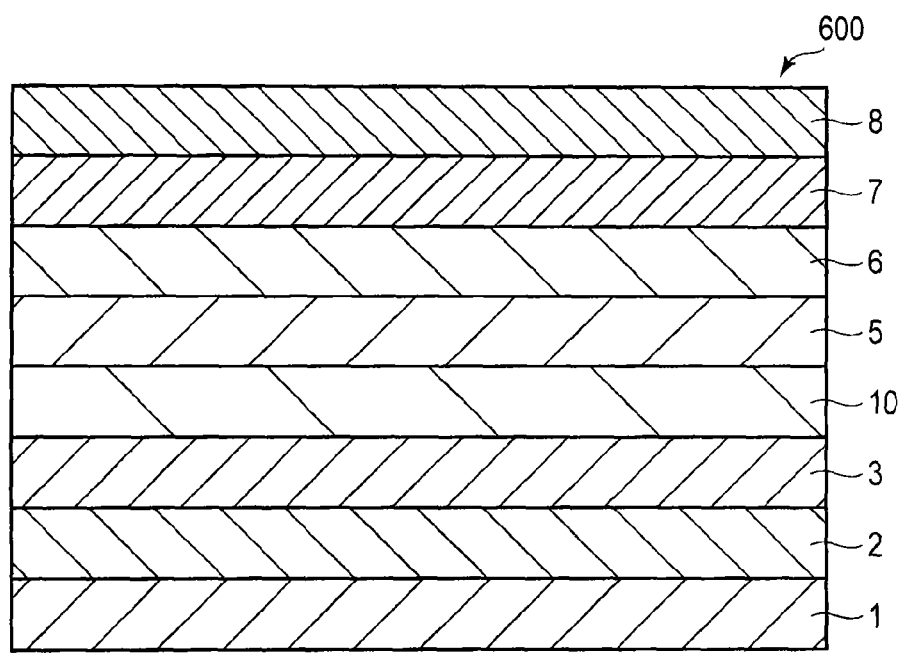
F I G. 7

MAGNETIC RECORDING MEDIUM AND MAGNETIC RECORDING AND REPRODUCING APPARATUS

CROSS-REFERENCE TO RELATED APPLICATIONS

This application is based upon and claims the benefit of priority from Japanese Patent Application No. 2014-155116, filed Jul. 30, 2014, the entire contents of which are incorporated herein by reference.

FIELD

Embodiments described herein relate generally to a magnetic recording medium, and a magnetic recording and reproducing apparatus.

BACKGROUND

A magnetic recording device such as a hard disk drive (HDD) used mainly in a computer to record and reproduce information has been applied to various fields such as home video recorder, audio device, and vehicle-mounted navigation system because of its excellent capacitance, cost effectiveness, data accessibility, and data-hold credibility. As HDD technique is being adopted in broader technical fields, higher storage capacity is required, and thus, developments of HDD with higher density have been pursued intensely in recent years.

As a magnetic recording method used in a commercially available HDD, a so-called perpendicular magnetic recording method is the mainstream in recent years. In the perpendicular magnetic recording method, a magnetic recording layer used to record information is made of magnetic crystal grains which have their easily magnetization axes in a direction orthogonal to a substrate of the layer. With such a structure, influence by an inverse magnetic field between recording bits can be reduced even in a densification process and the densification process itself can be performed in a magnetostatically stable condition. The perpendicular magnetic recording medium is generally structured with a substrate, soft magnetic underlayer to concentrate magnetic flux generated from a magnetic head in the recording, perpendicular magnetic recording layer containing a hard magnetic material, non-magnetic seed layer and/or non-magnetic underlayer to place the magnetic crystal grains in (00.1) surface orientation and reduce the orientation dispersion in the perpendicular magnetic recording layer, and protective layer to protect the surface of the perpendicular magnetic recording layer.

A granular-type recording layer has a so-called granular structure in which the magnetic crystal grains are surrounded by grain boundary regions made of non-magnetic materials, and therein, the magnetic crystal grains are two-dimensionally and physically isolated from each other by the non-magnetic grain boundary region and such a structure achieves reduction in magnetic exchange interaction between the magnetic grains. Thus, transition noise in recording and reproducing characteristics can be reduced and a limit bit size can be reduced also. Conversely, since the magnetic exchange interaction between the magnetic grains is reduced in the granular-type recording layer, the dispersion of the inverse magnetic field tends to increase depending on the dispersion of components and sizes of the grains and such a structure causes increase of the transition noise and jitter noise in the recording and reproducing characteristics.

Furthermore, the lower limit value of the recording bit size is set depending largely on the size of the magnetic crystal grains of the granular-type recording layer. Thus, for increasing recording density of the HDD, the grains in the granular-type recording layer are required to be fine-grained. As a method for fining the grains in the granular-type recording layer, it is known to use a technique of using a underlayer having fine-grained crystal grains to fine the grains of the granular-type recording layer layered thereon. Here, for fining the grains of the underlayer, there are several possible methods such as manipulating the non-magnetic seed layer and making the underlayer granular.

BRIEF DESCRIPTION OF THE DRAWINGS

FIG. 3 is a sectional view showing a structure of a comparative magnetic recording medium;

FIG. 4 is a sectional view showing another structure of a comparative magnetic recording medium;

FIG. 5 is a sectional view showing another structure of a comparative magnetic recording medium;

FIG. 6 is a sectional view showing another structure of a comparative magnetic recording medium; and FIG. 7 is a sectional view showing another structure of a magnetic recording medium according to the embodiments.

DETAILED DESCRIPTION

Hereinafter, embodiments are described with reference to the drawings.

A magnetic recording medium according to the embodiments includes: a non-magnetic substrate; an orientation control layer formed on the non-magnetic substrate, the orientation control layer made of a Ni alloy or Ag alloy having face centered cubic (fcc) structure; a non-magnetic seed layer formed in contact with the orientation control layer, the non-magnetic seed layer made of AgGe—X (X is selected from the group consisting of Al, Mg, Au, and Ti); a non-magnetic intermediate layer formed on the non-magnetic seed layer; and a perpendicular magnetic recording layer formed on the non-magnetic intermediate layer.

Figure 1:
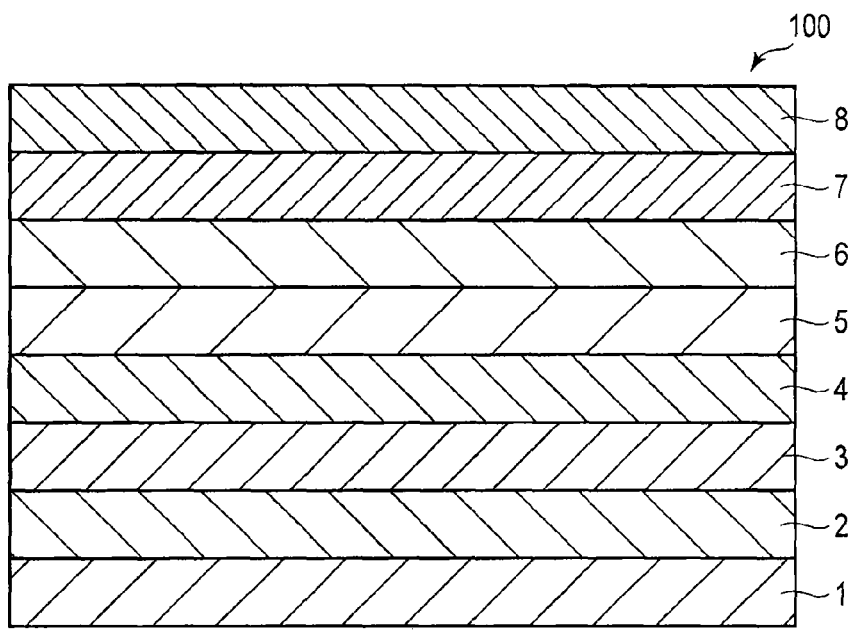
FIG. 1 is a sectional view showing a structure of a magnetic recording medium according to the embodiments.

FIG. 1 is a sectional view showing a structure of a perpendicular magnetic recording medium according to the embodiments.

As shown in FIG. 1, a perpendicular magnetic recording medium 100 has a structure in which an adhesion layer 2, a soft magnetic layer 3, an orientation control layer 4 having fcc structure, a non-magnetic seed layer 5, a non-magnetic intermediate layer 6, a perpendicular magnetic recording layer 7, and a protective layer 8 are sequentially provided on a non-magnetic glass substrate 1.

According to the embodiment, crystal orientation in the perpendicular magnetic recording layer can be improved by using the orientation control layer made of a Ni alloy or Ag alloy having fcc structure.

Pitch dispersion of magnetic grains of the perpendicular magnetic recording layer can be reduced by using the non-magnetic seed layer according to the embodiment.

Excellent crystal orientation and low pitch dispersion can be achieved at the same time in the perpendicular magnetic recording layer by bringing the orientation control layer and the non-magnetic seed layer into contact with each other, and consequently, medium noises can be reduced.

The orientation control layer has fcc structure and is made of a Ni alloy or an Ag alloy.

Examples of metals added to the Ni alloy include W, Cr, Mo, and C.

Examples of metals added to the Ag alloy include Ni, Ge, Cu, Pd, and Nd.

The content of the metal added to the Ni alloy can be set between 5 at % and 30 at % inclusive. Below 5 at %, Ni gains magnetism which becomes magnetic noise, and consequently, recording and reproducing characteristics tend to be deteriorated. Above 30 at %, the Ni alloy or the Ag alloy cannot hold fcc structure and becomes amorphous structure, and consequently, the crystal orientation tends to be deteriorated.

The content of the metal added to the Ag alloy can be set to 50 at % or less. Above 50 at %, the Ag alloy has a structure other than fcc structure, and becomes amorphous. Consequently, the crystal orientation tends to be deteriorated.

The non-magnetic seed layer can be formed of AgGe—X (X=Al, Mg, Au, Ti) made of columnar Ag—X (X=Al, Mg, Au, Ti) particles whose pitch dispersion is small and Ge grain boundaries surrounding the Ag—X particles. Si can be further added to AgGe—X. The pitch dispersion of the perpendicular magnetic recording layer can be further reduced by using the non-magnetic seed layer.

The non-magnetic seed layer can include crystal grains mainly including Ag, and at least one added metal selected from the group consisting of Al, Mg, Au, and Ti, and having fcc structure, and a grain boundary layer surrounding the crystal grains and made of Ge having amorphous structure. When Si is added, the grain boundary layer is formed of Ge—Si.

The content of the metal (X=Al, Mg, Au, Ti) added to the non-magnetic seed layer can be set between 3 at % and 20 at % inclusive with respect to the total atomic weight of Ag, Ge, and X. Below 3 at %, the benefit of the additive metals tends to be unobtainable. Above 20 at %, the crystalline structure of Ag particles is damaged due to excessive additive metal content and the crystal orientation tends to be deteriorated. When Si is further added to AgGe—X, the content of silicon can be set to 20 at % or less with respect to the total atomic weight of silver, germanium, metal X, and silicon in the non-magnetic seed layer. Above 20 at %, the non-magnetic seed layer tends to become amorphous due to excessive content of grain boundary material.

The non-magnetic seed layer can be formed using sputtering process performed at pressure between 0.05 and 0.3 Pa under inert atmosphere. Through these processes, the layers can be made of columnar Ag—X (X=Al, Mg, Au, Ti) particles whose pitch dispersion is small and Ge grain boundaries surrounding the Ag—X particles.

In the non-magnetic seed layer, the germanium content can be set between 55 at % and 70 at % inclusive. Below 55 at %, the particles are coupled to each other due to a shortage of grain boundary material, and consequently, the grain size dispersion tends to be deteriorated. Above 70 at %, the crystalline structure of Ag particles is damaged due to excessive grain boundary material, and consequently, the crystal orientation tends to be deteriorated.

As a substrate applicable to the embodiment, a glass substrate, Al alloy substrate, ceramic substrate, carbon substrate, and Si monocrystal substrate having an oxidation surface are available. The glass substrate may be an amorphous glass or a crystallization glass, for example. The amorphous glass may be a conventional soda lime glass or an aluminosilicate glass, for example. The crystallization glass may be a lithium crystallization glass, for example. The ceramic substrate may be a sintered material whose main ingredient is conventional aluminum oxide, aluminum nitride and silicon nitride, or a fiber reinforced material of the same. As the substrate, the above-mentioned metal substrate or non-metal substrate on which a thin film such as a NiP layer and the like is formed by plating method or sputtering method may be used. Instead of sputtering method, vacuum evaporation or electrolytic plating can be used to obtain the same effect.

Between the non-magnetic substrate and the orientation control layer, an adhesion layer, soft magnetic underlayer (SUL), and non-magnetic underlayer may be additionally interposed sequentially from the non-magnetic substrate.

The adhesion layer is provided to increase the adhesion between the substrate and the layer thereupon. As materials for the adhesion layer, materials having amorphous structure such as Ti, Ta, W, Cr, and Pt, alloy containing such materials, or oxide of or nitride of such materials can be used. The thickness of the adhesion layer may be set in a range between, for example, 5 and 30 nm inclusive. Below 5 nm, the adhesion is not sufficient and the film tends to be peeled off easily. Above 30 nm, the time for process becomes too long and throughput tends to be poor.

The SUL functions as a part of a magnetic head by passing a recording magnetic field from a monomagnetic pole head used to magnetize the perpendicular magnetic recording layer in a horizontal direction and returning the recording magnetic field to the magnetic head side. The SUL thus applies the steep and sufficient perpendicular magnetic field to the recording layer of the magnetic field and provides efficient recording and reproducing characteristics. As the soft magnetic underlayer, materials containing Co, Fe, or Ni may be used. Specifically, a Co alloy containing Co and at least one of Zr, Hf, Nb, Ta, Ti, and X may be used. The Co alloy may contain 70 at % or more of Co. On such a Co alloy, an amorphous layer is easily formed when sputtering method is adopted for forming the film. In the amorphous soft magnetic material, there is no crystal magnetic anisotropy, crystal defect, or grain boundary. Therefore, the amorphous soft magnetic material can exert highly superior soft magnetism and reduce the medium noises. As the amorphous soft magnetic material, CoZr, CoZrNb, and CoZrTa alloys are available, for example. Other materials for the soft magnetic underlayer may be a CoFe alloy such as CoFe, and CoFeV, FeNi alloy such as FeNi, FeNiMo, FeNiCr, and FeNiSi, FeAl and FeSi alloy such as FeAl, FeAlSi, FeAlSiCr, FeAlSiTiRu, and FeAlO, FeTa alloy such as FeTa, FeTaC, and FeTaN, and FeZr alloy such as FeZrN. Furthermore, materials having microcrystal structure such as FeAlO, FeMgO, FeTaN, and FeZrN in which Fe is contained 60 at % or more, or materials having granular structure including fine crystal grains dispersed in a matrix may be used. The thickness of the soft magnetic underlayer may be set in a range between, for example, 10 and 100 nm inclusive. Below 10 nm, recording magnetic field from the recording head is not sufficiently taken in the soft magnetic underlayer and recording and reproducing efficiency tends to be suppressed. Above 100 nm, the time for process becomes too long and throughput tends to be poor. Furthermore, the soft magnetic underlayer can be divided into a plurality of layers for spike noise prevention and non-magnetic dividing layers of 0.5 to 1.5 nm are interposed therebetween for antiferromagnetic coupling. As the non-magnetic dividing layer, Ru, Ru alloy, Pd, Cu, and Pt are available, for example. Furthermore, exchange coupling can be established between the soft magnetic underlayer and a hard magnetic film such as CoCrPt, SmCo, and FePt having in-plane anisotropy or a pin layer made of an antiferromagnetic material such as IrMn and PtMn. To control exchange coupling force, magnetic films of Co and the like or non-magnetic films of Pt and the like may be layered over and under the non-magnetic dividing layers.

The non-magnetic intermediate layer functions to isolate the magnetic grains of the magnetic recording layer formed thereon and to improve the crystallinity of the magnetic recording layer. The materials for the non-magnetic intermediate layer may be Ru or an alloy of Ru and at least one metal selected from the group consisting of Cr, Mo, Co, Mn, and Si. The thickness of the non-magnetic intermediate layer may be set in a range between, for example, 5 and 30 nm inclusive. Below 5 nm, the crystal orientation is not sufficient. Above 30 nm, a distance (spacing) between the magnetic head and the SUL is expanded. Writing to the magnetic recording layer becomes weak and the recording and reproducing characteristics tend to be poor.

The main ingredients of the magnetic recording layer applicable to the present embodiment are either iron or cobalt and platinum. Furthermore, the magnetic recording layer is desirably a perpendicular magnetic recording layer having magnetic anisotropy perpendicular to a substrate. In case of densification, external magnetic field from a recording dot works in a direction maintaining signals of surrounding recording dots in the perpendicular magnetic recording layer, and thus, signal vanishing due to thermal decay tends to be prevented and densification tends to be achieved smoothly.

The thickness of the magnetic recording layer may be set in a range between, for example, 3 and 30 nm inclusive, or more specifically, 5 and 15 nm inclusive. Within this range, a magnetic recording and reproducing apparatus which is much excellent in recording density can be manufactured. If the thickness of the magnetic recording layer is below 3 nm, reproduction output is too low and noise component tends to be more than the reproduction output. If the thickness of the magnetic recording layer is above 30 nm, reproduction output is too high and waveform tends to be distorted thereby. The magnetic recording layer may be formed as a combination of two or more layers, and in that case, the total thickness of the combination of layers can be set within the above-mentioned range. The coercive force of the magnetic recording layer can be set to 237000 A/m (3000 Oe) or more. If the coercive force can be below 237000 A/m (3000 Oe), the thermal decay resistance tends to be deteriorated. The perpendicular squareness ratio of the magnetic recording layer can be set to 0.8 or more. If the perpendicular squareness ratio is below 0.8, the thermal decay resistance tends to be deteriorated.

In the granular-type recording layer using Co, the Pt content in the magnetic recording layer is set in a range between 10 at % and 25 at % inclusive. From this range of the Pt content, a uniaxial crystal magnetic anisotropy constant (Ku) which is necessary for the magnetic recording layer can be obtained, crystal orientation of magnetic grains can be improved, and consequently, good thermal decay characteristics and good recording and reproducing characteristics for high density recording can be achieved. If the Pt content is set above or below this range, sufficient Ku for the thermal decay characteristics for high density recording tends to be unobtainable.

The protective layer applicable to the embodiment is for the purpose of preventing damage to the magnetic recording layer due to corrosion and damage to the medium surface due to a contact of the magnetic head to the medium. A material for the protective layer may be a material including C. The thickness of the protective layer can be set in a range between 1 to 10 nm inclusive, for example. Within this range, a distance between the head and the medium can be shortened and thus, high density recording is performable. Carbon used here may be classified as $sp^2$ coupling carbon (graphite) or $sp^3$ coupling carbon (diamond). $Sp^3$ coupling carbon is superior to graphite in both durability and corrosion resistance, but is inferior to graphite in surface smoothness due to its crystalline condition. In general, a carbon film is formed based on the sputtering method using the graphite target. Through this process, an amorphous carbon in which $sp^2$ coupling carbon and $sp^3$ coupling carbon are mixed is produced. The amorphous carbon in which $sp^3$ coupling carbon content is richer is called diamond-like carbon (DLC) which is excellent in durability and corrosion resistance, and is also excellent in surface smoothness because of its amorphous structure. Thus, DLC is used as a surface protective layer for a magnetic recording medium. In chemical-vapor deposition (CVD) method for producing DLC, excitation and decomposition of material gas are performed in plasma and DLC is generated by chemical reaction. Thus, if certain conditions are met, DLC with richer $sp^3$ coupling carbon content can be produced.

Figure 2:
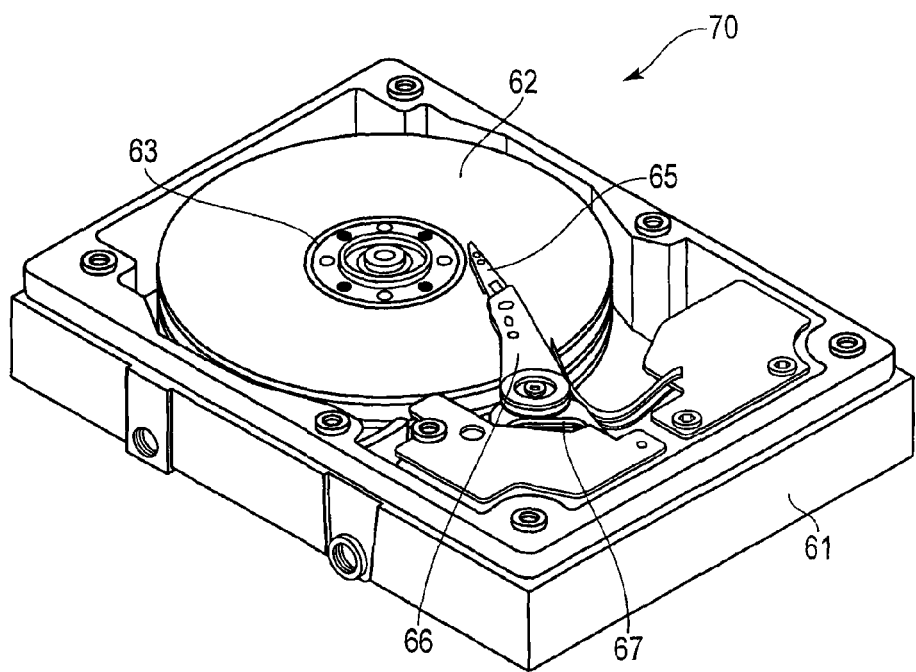
FIG. 2 is a perspective view showing an example of a magnetic recording and reproducing apparatus according to the embodiments in a partially-disassembled fashion.

FIG. 2 is a perspective view showing an example of a magnetic recording and reproducing apparatus according to the embodiment in a partially-disassembled fashion.

In a magnetic recording and reproducing apparatus 70 according to the embodiment, a rigid structure magnetic disk 62 for recording information is installed in a spindle 63 and is rotated at a constant rotation rate by a spindle motor (not shown). A magnetic head configured to record and reproduce information by accessing the magnetic disk 62 is mounted on a slider which is attached to a tip of a suspension 65 of a thin plate-shaped flat spring. The suspension 65 is connected to one end of an arm 66 including, for example, a bobbin supporting a drive coil (not shown).

A voice coil motor 67 which is a kind of a linear motor is disposed on the other end of the arm 66. The voice coil motor 67 includes a magnetic circuit in which a drive coil (not shown) wound around the bobbin of the arm 66 is sandwiched by a permanent magnet and an opposite yoke facing each other.

The arm 66 is supported by ball bearings (not shown) provided over and under a fixing axis and is rotated and slide by the voice coil motor 67. That is, the position of slider 64 on the magnetic disk 62 is controlled by the voice coil motor 67.

EXAMPLES

Hereinafter, Examples will be shown, and the embodiments will be specifically described.

Example 1 and Comparative Examples 1 to 4

A perpendicular magnetic recording medium according to Example 1 has the same structure as that in FIG. 1. Schematic sectional views representing perpendicular magnetic recording media according to Comparative Examples 1 to 4 are respectively shown in FIGS. 3 to 7.

Non-magnetic glass substrate 1 (KONICA MINOLTA, amorphous substrate MEL6, 2.5 inches in diameter) was placed in a film forming chamber of DC magnetron sputtering apparatus (CANON-ANELVA, C-3010), and air was exhausted from the chamber to the degree of vacuum of $1\times10^{-5}$ Pa. Then, Ar gas was introduced in the chamber in order to set gas pressure 0.7 Pa, and Cr-25 at % Ti layer whose thickness was 10 nm was formed on the substrate 1 at DC500W as an adhesion layer 2. Then, Co-20 at % Fe-7 at % Ta-5 at % Zr layer whose thickness was 40 nm was formed at DC500W as a soft magnetic layer 3. Then, Ni-5 at % W layer whose thickness was 5 nm was formed at DC500W as an orientation control layer 4. Then, Ar gas was introduced in the film forming chamber in order to set gas pressure 0.1 Pa, and Ag-60 at % Ge-10 at % Al film whose thickness was 5 nm was formed at DC100W as a non-magnetic seed layer 5. Then, Ar gas was introduced in the film forming chamber in order to set gas pressure 0.7 Pa again, and Ru layer whose thickness was 10 nm was formed at DC500W as a non-magnetic intermediate layer 6. Furthermore, Ru layer whose thickness was 10 nm was formed at DC500W with gas pressure changed to 6 Pa, to obtain Ru non-magnetic intermediate layer 6 whose total thickness was 20 nm. Then, (Co-18 at % Pt-14 at % Cr)-10 mol % $SiO_2$ layer whose thickness was 12 nm was formed at DC500W as a perpendicular magnetic recording layer 7. Then, a DLC protective layer 8 whose thickness was 2.5 nm was formed thereon using CVD method. Then, a lubricant agent (not shown) was applied thereon by dipping method to acquire a perpendicular magnetic recording medium 100 according to the embodiment.

As shown in FIG. 3, a perpendicular magnetic recording medium 200 according to Comparative Example 1 was manufactured in the same manner as in the medium of Example 1 except that the AgGe—Al seed layer 5 was omitted therefrom.

As shown in FIG. 4, a perpendicular magnetic recording medium 300 according to Comparative Example 2 was manufactured in the same manner as in the medium of Example 1 except that the NiW orientation control layer 4 was omitted therefrom.

As shown in FIG. 5, a perpendicular magnetic recording medium 400 according to Comparative Example 3 was manufactured in the same manner as in the medium of Example 1 except that a Ta underlayer 9 was formed between the NiW orientation control layer 4 and the AgGe—Al seed layer 5.

As shown in FIG. 6, a perpendicular magnetic recording medium 500 according to Comparative Example 4 was manufactured in the same manner as in the medium of Example 1 except that the order of the NiW orientation control layer 4 and AgGe—Al seed layer 5 to be formed was reversed.

Hereinafter, structures of the magnetic recording media obtained in Example 1 and Comparative Examples 1 to 4 will be shown.

Structure of Example 1

Non-magnetic glass substrate 1/CrTi adhesion layer 2/CoFeTaZr soft magnetic layer 3/NiW orientation control layer 4/AgGe-Al non-magnetic seed layer 5/Ru non-magnetic intermediate layer 6/CoCrPt-$SiO_2$ perpendicular magnetic recording layer 7/C protective layer 8

Structure of Comparative Example 1

Non-magnetic glass substrate 1/CrTi adhesion layer 2/CoFeTaZr soft magnetic layer 3/NiW orientation control layer 4/Ru non-magnetic intermediate layer 6/CoCrPt-$SiO_2$ perpendicular magnetic recording layer 7/C protective layer 8

Structure of Comparative Example 2

Non-magnetic glass substrate 1/CrTi adhesion layer 2/CoFeTaZr soft magnetic layer 3/AgGe-Al non-magnetic seed layer 5/Ru non-magnetic intermediate layer 6/CoCrPt-$SiO_2$ perpendicular magnetic recording layer 7/C protective layer 8

Structure of Comparative Example 3

Non-magnetic glass substrate 1/CrTi adhesion layer 2/CoFeTaZr soft magnetic layer 3/NiW orientation control layer 4/Ta underlayer 9/AgGe-Al non-magnetic seed layer 5/Ru non-magnetic intermediate layer 6/CoCrPt-$SiO_2$ perpendicular magnetic recording layer 7/C protective layer 8

Structure of Comparative Example 4

Non-magnetic glass substrate 1/CrTi adhesion layer 2/CoFeTaZr soft magnetic layer 3/AgGe-Al non-magnetic seed layer 5/NiW orientation control layer 4/Ru non-magnetic intermediate layer 6/CoCrPt-$SiO_2$ perpendicular magnetic recording layer 7/C protective layer 8

The obtained media of Example 1 and Comparative Examples 1 to 4 were measured and evaluated as follows.

Firstly, both the non-magnetic seed layer and the perpendicular magnetic recording layer were subjected to a transmission electron microscopy (TEM) measurement to measure their grain structures in a film plane direction. Furthermore, components of particles and grain boundaries were analyzed using an energy-dispersive X-ray spectroscope (TEM-EDX).

Based on the results of measurements by planar TEM analysis, the pitch analyses of the non-magnetic seed layer and the perpendicular magnetic recording layer were performed in the following manner.

From the planar TEM images taken at a magnification range between fifty thousand and two million times, optional images in which the number of grains was estimated at least 100 or more were taken into a computer as image information. The image information was then subjected to image processing to extract an outline and center of gravity of each crystal grain. From the distance between the centers of gravity of the adjacent grains, average pitch and pitch dispersion between the grains were derived. Grain boundary widths on a line connecting the centers of gravity of the grains were measured, and an average value of the measured grain boundary widths was set as a grain boundary width. Then, crystal orientations ($\Delta\theta_{50}$) of a non-magnetic seed layer and perpendicular magnetic recording layer of each of these media were checked by measuring a rocking curve with an X-ray diffractometer (XRD, SPECTRIS, Xpert-MRD).

The results of the pitch analysis and crystalline evaluation of the medium of each of Example 1 and Comparative Examples 1 to 4 are shown in the following Table 1.

In each of the medium of Example 1 and the media of Comparative Examples 2 and 4 (except Comparative Examples 1 and 4), it was found that the AgGe—Al film was made of crystalline Ag—Al particles whose average grain size is approximately 6 nm and amorphous Ge grain boundary whose grain boundary width was approximately 1.9 nm. Therein, the average pitch was 7.9 nm, and the pitch dispersion was 11.2%. In each of the medium of Example 1 and the media of Comparative Examples 1, 3, and 4, the NiW layer was made of NiW crystal grains which were in contact with each other, and grain boundary width was substantially zero. Here, the average grain size of NiW was 9 nm, and the pitch dispersion was 21.4%.

Then, in each of the medium of Example 1 and the media of Comparative Examples 1 to 4, it was found that the perpendicular magnetic recording layer was made of crystalline CoCrPt particles and amorphous SiO$_2$ grain boundaries. The perpendicular magnetic recording layer of the medium of Example 1 showed excellent results such as $\Delta\theta_{50}$ of 2.8 deg, average pitch of 8.1 nm, and pitch dispersion of 12.5%. On the other hand, in the medium of each of Comparative Examples 1 and 4, it was found that the perpendicular magnetic recording layer showed excellent the grain structure of the non-magnetic seed layer to the perpendicular magnetic recording layer and maintained improved crystal orientation in order to exert both low pitch dispersion and excellent crystal orientation at the same time. Consequently, the recording and reproducing characteristics were excellent in the medium of Example 1.

TABLE 1

|  | Orientation control layer Material | Underlayer Material | Non-magnetic seed layer | | | | Perpendicular magnetic recording layer | | | SNR (dB) |
|---|---|---|---|---|---|---|---|---|---|---|
|  |  |  | Material | $\Delta\theta 50$ (deg) | Average pitch (nm) | Pitch dispersion (%) | $\Delta\theta 50$ (deg) | Average pitch (nm) | Pitch dispersion (%) |  |
| Example 1 | NiW | — | AgGe—Al | 2.6 | 7.9 | 11.2 | 2.8 | 8.1 | 12.5 | 23.1 |
| Comparative Example 1 | NiW | — | — | — | — | — | 2.7 | 9.2 | 22 | 17.1 |
| Comparative Example 2 | — | — | AgGe—Al | 12.3 | 7.9 | 11.2 | 13.3 | 7.8 | 16.2 | 12.6 |
| Comparative Example 3 | NiW | Ta | AgGe—Al | 12.1 | 7.9 | 11.2 | 13 | 7.8 | 16.3 | 12.5 |
| Comparative Example 4 | AgGe—Al | — | NiW | 3.3 | 9 | 21.4 | 3.6 | 9.3 | 22.6 | 16.8 | results such as $\Delta\theta_{50}$ of 2.7 deg and 3.6 deg. However, it was found that the perpendicular magnetic recording layer showed average grain size of 9.2 to 9.3 nm and pitch dispersion of 22 to 22.6% which were worse than those of the medium of Example 1. In the medium of each of Comparative Examples 2 and 3, the perpendicular magnetic recording layer showed comparatively excellent results such as average pitch of 7.8 nm and pitch dispersion of 16.2 to 16.3 nm. However, it was found that the perpendicular magnetic recording layer showed $\Delta\theta_{50}$ of 13 to 13.3 deg which was much worse than that of the medium of Example 1.

Now, the recording and reproducing characteristics were evaluated in each of these media. The evaluation was performed using RWA1632 read-write analyzer and S1701MP spinstands of GUZIK, U.S.A. Furthermore, the evaluation was performed using a head including a shielded magnetic pole which is a single-poled magnetic pole with a shield (to converge the magnetic flux from the magnetic head) for writing, and a TMR device for reading, and adopting track recording density of 1400 kBPI for recording frequency. Table 1 shows results obtained from the evaluation. It was found that the medium of Example 1 of the present application exerted excellent 23.1 dB in the recording and reproducing characteristics as compared to that of the medium of each of Comparative Examples 1 to 4.

To summarize, the media of Comparative Examples 2 and 3 showed the pitch dispersion of the perpendicular magnetic recording layer which was better than that of the Comparative Example 1 but was slightly worse than that of Example 1, and showed the crystal orientation which was much worse than that of Example 1, namely, 10 deg or more. Furthermore, the medium of each of Comparative Examples 1 and 4 showed the crystal orientation which was substantially the same as that of Example 1 but showed the pitch dispersion above 20% which was much worse than that of Example 1. That is, none of the media of Comparative Examples 1 to 4 could improve the pitch dispersion and the crystal orientation at the same time. Therefore, it was found that the recording and reproducing characteristics of Comparative Examples were worse than those of Example 1. In contrast, it was recognized that the medium of Example 1 transferred Examples 2 to 6 and Comparative Examples 5 to 8

Perpendicular magnetic recording media according to Examples 2 to 4 and Comparative Examples 5 to 8 having the same structure as that in FIG. 1 were manufactured in the same manner as in the medium of Example 1 except that the non-magnetic seed layer 5 was changed as the following Table 2.

As shown in FIG. 7, perpendicular magnetic recording media 600 according to Examples 5 and 6 were manufactured in the same manner as in the medium of Example 1 except that an Ag orientation control layer 10 was formed instead of the orientation control layer 4.

Hereinafter, structures of the magnetic recording media obtained in Examples 2 to 6 and Comparative Examples 5 to 8 will be shown.

Structures of Examples 2 to 4
Non-magnetic glass substrate 1/CrTi adhesion layer 2/CoFeTaZr soft magnetic layer 3/NiW orientation control layer 4/AgGe-X non-magnetic seed layer 5 (X=Mg, Au, Ti)/Ru non-magnetic intermediate layer 6/CoCrPt-SiO$_2$ perpendicular magnetic recording layer 7/C protective layer 8

Structures of Examples 5 and 6
Non-magnetic glass substrate 1/CrTi adhesion layer 2/CoFeTaZr soft magnetic layer 3/Ag orientation control layer 10/AgGe-Al non-magnetic seed layer 5/Ru non-magnetic intermediate layer 6/CoCrPt-SiO$_2$ perpendicular magnetic recording layer 7/C protective layer 8

Structures of Comparative Examples 5 to 8
Non-magnetic glass substrate 1/CrTi adhesion layer 2/CoFeTaZr soft magnetic layer 3/NiW orientation control layer 4/AgGe-X non-magnetic seed layer 5 (X=Pt, Pd, Ru, Cr)/Ru non-magnetic intermediate layer 6/CoCrPt-SiO$_2$ perpendicular magnetic recording layer 7/C protective layer 8

The non-magnetic seed layer 5 of each of the media was subjected to a planar TEM analysis and TEM-EDX analysis. In the non-magnetic seed layer 5 of the medium of each of Examples 2 to 6, it was found that the AgGe—X film was made of crystalline Ag—X particles (X=Al, Mg, Au, Ti) whose grain sizes were approximately 6 nm and which had fcc structure and amorphous Ge grain boundaries whose grain boundary widths were approximately 1 to 2 nm. Here, the pitch dispersion was low at approximately 11 to 12%.

On the other hand, in the non-magnetic seed layer 5 of the medium of each of Comparative Examples 5 to 8, it was found that the AgGe—X film (X=Pt, Pd, Ru, Cr) had a membrane surface having a uniform amorphous structure without being separated into particles and grain boundaries. It is considered that the grain structure was damaged by adding Pt, Pd, Ru, and Cr.

Crystal orientation, average pitch, pitch dispersion, and recording and reproducing characteristics were checked for each of the media in the same manner as in Example 1. As can be understood from Table 2, the medium of each of Examples 2 to 6 was improved as compared to the medium of each of Comparative Examples 5 to 8. Thereby, the medium of each of Examples 2 to 6 showed improved recording and reproducing characteristics as compared to those of the medium of each of Comparative Examples 5 to 8.

additive amount of Al in the non-magnetic seed layer 5 was changed as the following Table 3.

Hereinafter, structures of Examples 7 to 10 and Comparative Examples 9 to 11 will be shown.

Non-magnetic glass substrate 1/CrTi adhesion layer 2/CoFeTaZr soft magnetic layer 3/NiW orientation control layer 4/AgGe-Al non-magnetic seed layer 5/Ru non-magnetic intermediate layer 6/CoCrPt-SiO$_2$ perpendicular magnetic recording layer 7/C protective layer 8

The non-magnetic seed layer of each of the media was subjected to a planar TEM analysis and TEM-EDX analysis. In the non-magnetic seed layer of the medium of each of Examples 1 and 7 to 10, it was found that the AgGe—Al film was made of crystalline Ag—Al particles whose grain sizes were approximately 6 nm and which had fcc structure and amorphous Ge grain boundaries whose grain boundary widths were approximately 1 to 2 nm. Here, the pitch dispersion was low at approximately 11 to 12%. On the other hand, in the non-magnetic seed layer of the medium of

TABLE 2

|  | Orientation control layer Material | Non-magnetic seed layer |  |  | Perpendicular magnetic recording layer |  |  |  |
|---|---|---|---|---|---|---|---|---|
|  |  | Material | Δθ50 (deg) | Average pitch (nm) | Pitch dispersion (%) | Δθ50 (deg) | Average pitch (nm) | Pitch dispersion (%) | SNR (dB) |
| Example 1 | NiW | AgGe—Al | 2.6 | 7.9 | 11.2 | 2.8 | 8.1 | 12.5 | 23.1 |
| Example 2 | NiW | AgGe—Mg | 2.7 | 7.8 | 11.3 | 2.9 | 8.2 | 12.8 | 22.7 |
| Example 3 | NiW | AgGe—Au | 2.8 | 7.8 | 11.5 | 2.9 | 8.3 | 13 | 22.3 |
| Example 4 | NiW | AgGe—Ti | 2.9 | 7.9 | 11.7 | 3 | 8.3 | 13.2 | 22.1 |
| Example 5 | Ag | AgGe—Al | 3 | 7.9 | 11.2 | 3.3 | 8.1 | 12.5 | 22.9 |
| Example 6 | Ag—20%Ni | AgGe—Al | 2.5 | 7.9 | 11.2 | 2.7 | 8.1 | 12.5 | 23.3 |
| Comparative Example 5 | NiW | AgGe—Pt | — | — | — | 15.1 | 8.6 | 22.2 | 16.5 |
| Comparative Example 6 | NiW | AgGe—Pd | — | — | — | 15.2 | 8.7 | 23.3 | 15.1 |
| Comparative Example 7 | NiW | AgGe—Ru | — | — | — | 15.3 | 8.8 | 23.4 | 15.2 |
| Comparative Example 8 | NiW | AgGe—Cr | — | — | — | 15 | 8.3 | 22 | 16.9 |

Examples 7 to 10 and Comparative Examples 9 to 11

Perpendicular magnetic recording media according to Examples 7 to 10 and Comparative Examples 9 to 11 having the same structure as that in FIG. 1 were manufactured in the same manner as in the medium of Example 1 except that the Comparative Example 9, it was found that the AgGe film was made of crystalline Ag particles whose grain sizes were approximately 6 nm and amorphous Ge grain boundaries whose grain boundary widths were approximately 1 to 2 nm. However, it was found that the pitch dispersion of Comparative Example 9 was approximately 19%, and worse than that of each of Examples 1 and 7 to 10. Then, in the non-magnetic seed layer of the medium of each of Comparative Examples 10 and 11, it was found that the AgGe—Al film had a membrane surface having a uniform amorphous structure without having particles and a grain boundary structure. It is considered that the amount of Al as an added material was too much and the grain structure was damaged.

Recording and reproducing characteristics were measured for the media in the same manner as in Example 1. As can be understood from Table 3, it was found that the medium of each of Examples 1 and 7 to 11 showed excellent recording and reproducing characteristics as compared to those of the medium of each of Comparative Examples 9 to 11.

AgGe—Al film had a membrane surface having a uniform amorphous structure without having particles and a grain boundary structure. It is considered that such a structure was created since the amount of grain boundary material Ge in the layer was too much and the grain structure was damaged thereby. Recording and reproducing characteristics were checked for the media in the same manner as in Example 1. As can be understood from Table 4, the medium of each of Examples 1 and 11 to 13 showed excellent recording and reproducing characteristics as compared to those of the medium of each of Comparative Examples 12 to 17.

TABLE 3

| | | Non-magnetic seed layer | | | Perpendicular magnetic recording layer | | | |
|---|---|---|---|---|---|---|---|---|
| | Material | $\Delta\theta 50$ (deg) | Average pitch (nm) | Pitch dispersion (%) | $\Delta\theta 50$ (deg) | Average pitch (nm) | Pitch dispersion (%) | SNR (dB) |
| Example 7 | AgGe—3%Al | 3 | 7.5 | 11.9 | 3.3 | 7.8 | 13 | 22.6 |
| Example 8 | AgGe—5%Al | 2.8 | 7.6 | 11.7 | 3.1 | 7.8 | 12.9 | 22.9 |
| Example 1 | AgGe—10%Al | 2.6 | 7.9 | 11.2 | 2.8 | 8.1 | 12.5 | 23.1 |
| Example 9 | AgGe—15%Al | 2.7 | 7.7 | 11.4 | 2.9 | 7.9 | 12.8 | 22.8 |
| Example 10 | AgGe—20%Al | 2.9 | 7.1 | 12 | 3 | 7.3 | 13.1 | 22.1 |
| Comparative Example 9 | AgGe | 3.3 | 7.5 | 19 | 3.6 | 7.8 | 20.5 | 18 |
| Comparative Example 10 | AgGe—25%Al | — | — | — | 14.5 | 8.2 | 22.5 | 16.4 |
| Comparative Example 11 | AgGe—30%Al | — | — | — | 14.8 | 8.4 | 22.8 | 16 |

Examples 11 to 13 and Comparative Examples 12 to 17

Perpendicular magnetic recording media according to Examples 11 to 13 and Comparative Examples 12 to 17 having the same structure as that in FIG. 1 were manufactured in the same manner as in Example 1 except that a non-magnetic seed layer 5 was formed using an AgGe—Al target in which the composition amount of Ge in the non-magnetic seed layer was changed to 40 at % to 85 at %.

Hereinafter, structures of Examples 11 to 13 and Comparative Examples 12 to 17 will be shown.

Non-magnetic glass substrate 1/CrTi adhesion layer 2/CoFeTaZr soft magnetic layer 3/NiW orientation control layer 4/AgGe-Al non-magnetic seed layer 5/Ru non-magnetic intermediate layer 6/CoCrPt-SiO$_2$ perpendicular magnetic recording layer 7/C protective layer 8

The non-magnetic seed layer 5 of each of the media was subjected to a planar TEM analysis and TEM-EDX analysis. In the non-magnetic seed layer of the medium of each of Examples 1 and 11 to 13, it was found that the AgGe—Al film was made of crystalline Ag—Al particles whose grain sizes were approximately 6 nm and which had fcc structure and amorphous Ge grain boundaries whose grain boundary widths were approximately 0.1 to 2 nm. Here, the pitch dispersion was low at approximately 11 to 12%. On the other hand, the non-magnetic seed layer of the medium of each of Comparative Examples 12 to 14 showed such a structure that several Ag—Al particles were apparently connected to each other. It is considered that such a structure was created since the amount of grain boundary material Ge in the layer was too little to cut the Ag—Al particles sufficiently. Next, in the non-magnetic seed layer of the medium of each of Comparative Examples 15 to 17, it was found that the

TABLE 4

| | Non-magnetic seed layer material | SNR (dB) |
|---|---|---|
| Example 11 | Ag—55% Ge—10% Al | 22.5 |
| Example 1 | Ag—60% Ge—10% Al | 23.1 |
| Example 12 | Ag—65% Ge—10% Al | 22.8 |
| Example 13 | Ag—70% Ge—10% Al | 22.4 |
| Comparative Example 12 | Ag—40% Ge—10% Al | 18.3 |
| Comparative Example 13 | Ag—45% Ge—10% Al | 18.5 |
| Comparative Example 14 | Ag—50% Ge—10% Al | 18.8 |
| Comparative Example 15 | Ag—75% Ge—10% Al | 15.8 |
| Comparative Example 16 | Ag—80% Ge—10% Al | 15.2 |
| Comparative Example 17 | Ag—85% Ge—10% Al | 15 |

Examples 14 to 18 and Comparative Examples 18 and 19

Perpendicular magnetic recording media according to Examples 14 to 18 and Comparative Examples 18 and 19 having the same structure as that in FIG. 1 were manufactured in the same manner as in Example 1 except that a non-magnetic seed layer 5 was formed using an AgGe—Al—Si target in which the composition amount of Si in the non-magnetic seed layer was changed to 0 at % to 30 at % by further adding Si to the non-magnetic seed layer.

Hereinafter, structures of Examples 14 to 18 and Comparative Examples 18 and 19 will be shown.

Non-magnetic glass substrate 1/CrTi adhesion layer 2/CoFeTaZr soft magnetic layer 3/NiW orientation control layer 4/AgGe—Al—Si non-magnetic seed layer 5/Ru non-magnetic intermediate layer 6/CoCrPt-SiO$_2$ perpendicular magnetic recording layer 7/C protective layer 8

The non-magnetic seed layer 5 of each of the media was subjected to a planar TEM analysis and TEM-EDX analysis. In the non-magnetic seed layer of the medium of each of Examples 14 to 18, it was found that the AgGe—Al—Si film was made of crystalline Ag—Al particles whose grain sizes were approximately 6 nm and which had fcc structure and amorphous Ge—Si grain boundaries whose grain boundary widths were approximately 1 to 2 nm. Here, the pitch dispersion was low at approximately 11 to 12% (the pitch dispersion of the perpendicular magnetic recording layer was 12 to 13%). On the other hand, in the non-magnetic seed layer of the medium of each of Comparative Examples 18 and 19, it was found that the AgGe—Al—Si film had a membrane surface having a uniform amorphous structure without having particles and a grain boundary structure. It is considered that such a structure was created since the amount of grain boundary material Ge—Si in the layer was too much and the grain structure was damaged thereby.

Crystal orientation, average pitch, pitch dispersion, and recording and reproducing characteristics of the perpendicular magnetic recording layer were checked for the media in the same manner as in Example 1. As can be understood from Table 5, the medium of each of Examples 14 to 18 showed excellent recording and reproducing characteristics as compared to those of the medium of each of Comparative Examples 18 and 19.

TABLE 5

| | Non-magnetic seed layer material | Perpendicular magnetic recording layer | | | |
|---|---|---|---|---|---|
| | | Δθ50 (deg) | Average pitch (nm) | Pitch dispersion (%) | SNR (dB) |
| Example 1 | AgGe—10% Al | 2.8 | 8.1 | 12.5 | 23.1 |
| Example 14 | AgGe—10% Al—3% Si | 2.8 | 8.1 | 12.6 | 23.1 |
| Example 15 | AgGe—10% Al—5% Si | 2.8 | 8.1 | 12.7 | 23.2 |
| Example 16 | AgGe—10% Al—10% Si | 2.8 | 8 | 12.4 | 23.3 |
| Example 17 | AgGe—10% Al—15% Si | 2.9 | 8 | 12.3 | 22.7 |
| Example 18 | AgGe—10% Al—20% Si | 2.9 | 8 | 12.1 | 22.5 |
| Comparative Example 18 | AgGe—10% Al—25% Si | 12.5 | 8.2 | 21.1 | 17.7 |
| Comparative Example 19 | AgGe—10% Al—30% Si | 12.8 | 8.2 | 21.6 | 17.4 |

Examples 19 to 21

Perpendicular magnetic recording media 100 according to Examples 19 to 21 having the same structure as that in FIG. 1 were manufactured in the same manner as in Example 1 except that the composition of the non-magnetic seed layer was changed as the following Table 6.

Hereinafter, structures of Examples 19 to 21 will be shown.

Non-magnetic glass substrate 1/CrTi adhesion layer 2/CoFeTaZr soft magnetic layer 3/NiW orientation control layer 4/AgGe—X—Si non-magnetic seed layer 5 (X=Al, Mg, Au, Ti)/Ru non-magnetic intermediate layer 6/CoCrPt-SiO$_2$ perpendicular magnetic recording layer 7/C protective layer 8

Crystal orientation, average pitch, pitch dispersion, and recording and reproducing characteristics of the perpendicular magnetic recording layer were checked for the media in the same manner as in Example 1. As can be understood from Table 6, the medium of each of Examples 19 to 21 showed excellent recording and reproducing characteristics as compared to those of the medium of each of Comparative Examples.

TABLE 6

| | Non-magnetic seed layer material | Perpendicular magnetic recording layer | | | |
|---|---|---|---|---|---|
| | | Δθ50 (deg) | Average pitch (nm) | Pitch dispersion (%) | SNR (dB) |
| Example 16 | AgGe—10% Al—10% Si | 2.8 | 8 | 12.4 | 23.3 |
| Example 19 | AgGe—10% Mg—10% Si | 2.8 | 8.1 | 12.6 | 23 |
| Example 20 | AgGe—10% Au—10% Si | 2.7 | 8 | 12.8 | 22.9 |
| Example 21 | AgGe—10% Cr—10% Si | 2.9 | 7.9 | 12.9 | 22.7 |

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording medium comprising:
   a non-magnetic substrate;
   an orientation control layer formed on the non-magnetic substrate, the orientation control layer made of a nickel alloy or silver alloy having a face-centered cubic lattice structure;

a non-magnetic seed layer formed in contact with the orientation control layer, the non-magnetic seed layer made of silver, germanium, and at least one metal X selected from the group consisting of aluminum, magnesium, and gold;

a non-magnetic intermediate layer formed on the non-magnetic seed layer, the non-magnetic intermediate layer made of ruthenium or ruthenium alloy; and a magnetic recording layer formed on the non-magnetic intermediate layer.

2. The magnetic recording medium according to claim 1, wherein the non-magnetic seed layer includes particles made of silver, and a metal X selected from the group consisting of aluminum, magnesium, and gold and having a face-centered cubic lattice structure, and amorphous germanium grain boundaries among the particles.

3. The magnetic recording medium according to claim 1, wherein the content of the metal X is set in a range between 3 at % and 20 at % inclusive with respect to the total atomic weight content of silver, germanium, and metal X in the non-magnetic seed layer.

4. A magnetic recording medium comprising:

a non-magnetic substrate;

an orientation control layer formed on the non-magnetic substrate, the orientation control layer made of a nickel alloy or silver alloy having a face-centered cubic lattice structure;

a non-magnetic seed layer formed in contact with the orientation control layer, the non-magnetic seed layer made of silver, germanium, silicon, and at least one metal X selected from the group consisting of aluminum, magnesium, gold, and titanium;

a non-magnetic intermediate layer formed on the non-magnetic seed layer, the non-magnetic intermediate layer made of ruthenium or ruthenium alloy; and a magnetic recording layer formed on the non-magnetic intermediate layer.

5. The magnetic recording medium according to claim 4, wherein the non-magnetic seed layer includes particles made of silver, and a metal X selected from the group consisting of aluminum, magnesium, gold, and titanium and having a face-centered cubic lattice structure, and amorphous germanium silicon grain boundaries among the particles.

6. The magnetic recording medium according to claim 4, wherein the content of silicon is set in a range of 20 at % or less with respect to the total atomic weight content of silver, germanium, metal X, and silicon in the non-magnetic seed layer.

7. A magnetic recording and reproducing apparatus comprising:

a magnetic recording medium comprising: a non-magnetic substrate; an orientation control layer formed on the non-magnetic substrate, the orientation control layer made of a nickel alloy or silver alloy having a face-centered cubic lattice structure; a non-magnetic seed layer formed in contact with the orientation control layer, the non-magnetic seed layer made of silver, germanium, and at least one metal X selected from the group consisting of aluminum, magnesium, and gold; a non-magnetic intermediate layer formed on the non-magnetic seed layer, the non-magnetic intermediate layer made of ruthenium or ruthenium alloy; and a magnetic recording layer formed on the non-magnetic intermediate layer;

a mechanism configured to support and rotate the magnetic recording medium;

a magnetic head including a device configured to record information in the magnetic recording medium and a device configured to reproduce the information recorded in the medium; and a carriage assembly configured to movably support the magnetic head to the magnetic recording medium.

8. The magnetic recording and reproducing apparatus according to claim 7, wherein the non-magnetic seed layer includes particles made of silver, and a metal X selected from the group consisting of aluminum, magnesium, and gold and having a face-centered cubic lattice structure, and amorphous germanium grain boundaries among the particles.

9. The magnetic recording and reproducing apparatus according to claim 7, wherein the content of the metal X is set in a range between 3 at % and 20 at % inclusive with respect to the total atomic weight content of silver, germanium, and metal X in the non-magnetic seed layer.

10. A magnetic recording and reproducing apparatus comprising:

a magnetic recording medium comprising: a non-magnetic substrate; an orientation control layer formed on the non-magnetic substrate, the orientation control layer made of a nickel alloy or silver alloy having a face-centered cubic lattice structure; a non-magnetic seed layer formed in contact with the orientation control layer, the non-magnetic seed layer made of silver, germanium, silicon, and at least one metal X selected from the group consisting of aluminum, magnesium, gold, and titanium; a non-magnetic intermediate layer formed on the non-magnetic seed layer, the non-magnetic intermediate layer made of ruthenium or ruthenium alloy; and a magnetic recording layer formed on the non-magnetic intermediate layer;

a mechanism configured to support and rotate the magnetic recording medium;

a magnetic head including a device configured to record information in the magnetic recording medium and a device configured to reproduce the information recorded in the medium; and a carriage assembly configured to movably support the magnetic head to the magnetic recording medium.

11. The magnetic recording and reproducing apparatus according to claim 10, wherein the non-magnetic seed layer includes particles made of silver, and a metal X selected from the group consisting of aluminum, magnesium, gold, and titanium and having a face-centered cubic lattice structure, and amorphous germanium silicon grain boundaries among the particles.

12. The magnetic recording and reproducing apparatus according to claim 10, wherein the content of silicon is set in a range of 20 at % or less with respect to the total atomic weight content of silver, germanium, metal X, and silicon in the non-magnetic seed layer.

* * * * *